(12) United States Patent
Yang et al.

(10) Patent No.: US 10,718,932 B2
(45) Date of Patent: Jul. 21, 2020

(54) LIGHT SHEET IMAGING MICROSCOPY USING AN OPTICAL TRAP

(71) Applicant: UNIVERSITY COURT OF THE UNIVERSITY OF ST ANDREWS, St Andrews Fife (GB)

(72) Inventors: Zhengyi Yang, St Andrews Fife (GB); Kishan Dholakia, St Andrews Fife (GB)

(73) Assignee: UNIVERSITY COURT OF THE UNIVERSITY OF ST ANDREWS, St Andrews (GB)

( * ) Notice: Subject to any disclaimer, the term of this patent is extended or adjusted under 35 U.S.C. 154(b) by 0 days.

(21) Appl. No.: 15/566,889

(22) PCT Filed: May 9, 2016

(86) PCT No.: PCT/GB2016/051317
§ 371 (c)(1),
(2) Date: Oct. 16, 2017

(87) PCT Pub. No.: WO2016/185170
PCT Pub. Date: Nov. 24, 2016

(65) Prior Publication Data
US 2018/0101000 A1 Apr. 12, 2018

(30) Foreign Application Priority Data
May 15, 2015 (GB) .................................. 1508376.9

(51) Int. Cl.
*G02B 21/32* (2006.01)
*G21K 1/00* (2006.01)
(Continued)

(52) U.S. Cl.
CPC ......... *G02B 21/32* (2013.01); *G01N 21/6458* (2013.01); *G02B 21/0032* (2013.01);
(Continued)

(58) Field of Classification Search
None
See application file for complete search history.

(56) References Cited

U.S. PATENT DOCUMENTS 8,076,632 B2 12/2011 Kreysing et al.
2009/0190221 A1* 7/2009 Boer ..................... G02B 21/32
359/558
(Continued)

FOREIGN PATENT DOCUMENTS

CN 104204898 A 12/2014
WO 2013097869 A1 7/2013

OTHER PUBLICATIONS

Bambardekar et al., "Direct laser manipulation reveals the mechanics of cell contacts in vivo", Proceedings of the National Academy of Sciences, 112 (5) 1416-21 (Jan. 20, 2015).*
(Continued)

*Primary Examiner* — James Choi
(74) *Attorney, Agent, or Firm* — Moore & Van Allen PLLC; W. Kevin Ransom

(57) ABSTRACT

An optical system comprising trapping optics for forming an optical trap using counter propagating beams of light and light sheet imaging optics for light sheet imaging a particle, for example a cell, that is positioned in the optical trap, wherein the wavelength of the counter propagating beams of light and the wavelength of the light used for light sheet imaging are non-interfering.

16 Claims, 3 Drawing Sheets

(51) Int. Cl.
G02B 21/00 (2006.01)
G02B 21/06 (2006.01)
G01N 21/64 (2006.01)
G02B 21/36 (2006.01)

(52) U.S. Cl.
CPC ......... *G02B 21/0076* (2013.01); *G02B 21/06* (2013.01); *G02B 21/361* (2013.01); *G21K 1/006* (2013.01); *G02B 21/0048* (2013.01)

(56) References Cited

U.S. PATENT DOCUMENTS

| | | | | |
|---|---|---|---|---|
| 2010/0282984 | A1* | 11/2010 | Kreysing | B03C 5/005 250/492.1 |
| 2011/0174961 | A1* | 7/2011 | Kishan | G02B 6/02295 250/251 |
| 2013/0171685 | A1 | 7/2013 | Schutze et al. | |
| 2014/0346335 | A1* | 11/2014 | Gluckstad | G02B 21/32 250/251 |
| 2015/0029325 | A1 | 1/2015 | Dholakia et al. | |

OTHER PUBLICATIONS

Grass, David (2013) "Optical trapping and transport of nanoparticles with hollow core photonic crystal fibers." Master Thesis, University of Vienna. Available online at http://othes.univie.ac.at/28929/ (Year: 2013).*

International Search Report from the Intellectual Property Office of UK for PCT/GB2016/051317 dated Jun. 21, 2016.

International Preliminary Report on Patentability and Written Opinion of the International Searching Authority of UK for PCT/GB2016/051317 dated Jun. 21, 2016.

Written Opinion of the International Searching Authority of UK for PCT/GB2016/051317 dated Jun. 21, 2016.

Kapil Bambardekar et al; "Direct laser manipulation reveals the mechanics of cell contacts in vivo"; Proceedings of the National Academy of Sciences, vol. 112, No. 5, Jan. 20, 2015, pp. 1416-1421, XP055221095, US: ISSN: 0027-8424, D01: 10.1073/pnas. 1418732112 p. 1421 Figures 1A, S1.

Pitzek, M., et al., Optical mirror trap with a large field of view, Optics Express, Oct. 26, 2009, vol. 17, No. 22, pp. 19414-19423.

University Court of the University of St Andrews, Chinese Application No. 201680027702.6, Office Action, dated Aug. 2, 2019.

* cited by examiner

LIGHT SHEET IMAGING MICROSCOPY USING AN OPTICAL TRAP

CROSS-REFERENCE TO RELATED APPLICATION(S)

This application is a national stage application (filed under 35 § U.S.C. 371) of PCT/GB2016/051317, filed May 9, 2016 of the same title, which, in turn claims priority to UK Application No. 1508376.9, filed May 15, 2015 of the same title; the contents of each of which are hereby incorporated by reference.

FIELD OF THE INVENTION

The present invention relates to optical manipulation and imaging of samples, for example biological samples. In particular, the present invention relates to light sheet imaging in an optical trap.

BACKGROUND OF THE INVENTION

Light sheet fluorescence microscopy or selective plane illumination microscopy uses a thin sheet of light to illuminate a sample, whilst fluorescent images are taken perpendicular to the illuminated plane. This geometry gives light sheet fluorescence microscopy multiple advantages over other types of microscopy: Firstly, the unilluminated part of the sample remains unexposed to light and cannot be detected. This enhances the axial resolution and image contrast, and also reduces photo-bleaching and phototoxicity to which the sample is exposed. Secondly, the axial resolution of light sheet fluorescence microscopy is mainly determined by the thickness of the light sheet, which is independent of the detection optics. Hence, low magnification objectives can be used for a large field of view, while still achieving good axial resolution. Thirdly, as the whole plane is simultaneously illuminated and imaged, the imaging speed is enhanced compared to scanning confocal microscopy. These advantages make light sheet fluorescence microscopy suitable for constructing 3D images of large samples and even long term monitoring of a living sample. This modality can be extended by utilizing more advanced beam shapes, such as the Bessel beam or the Airy beam.

Present methods for recording 3D stacks of samples in light sheet fluorescence microscopy include either mechanically moving the sample along the detection axis or moving the light sheet and the detection objective along the detection axis at a fixed distance from each other. In both methods, gel is usually used to hold the specimen whilst it is mechanically scanned along the detection axis. The resultant interface between the gel and water introduces optical aberration due to the refractive index mismatch between the two media, thus reducing image quality. In addition, long term monitoring using this mode of confinement can restrict the development of the biological sample. Also, for mobile specimens, such as ocean swimming micro-organisms, the specimen has to be anaesthetized or physically constrained with sufficient force to overcome beating cilia to stop the specimen's movement. The use of anaesthetics and/or physical force may compromise the development and normal functioning of the organism, particularly if required for prolonged periods of time.

SUMMARY OF THE INVENTION

According to the present invention, there is provided an optical system comprising trapping optics for forming an optical trap using counter propagating beams of light and light sheet imaging optics for light sheet imaging a particle, for example a cell, that is positioned in the optical trap. Preferably, the optical trap is able to hold or position the sample, for example a cell, in such a way that the sample is undistorted, i.e. the sample is held within the trap in its natural undistorted state.

Using counter propagating beam traps, sometimes referred to as dual beam optical tweezers, provides contactless and contamination-free handling of micro-organisms, enabling them to be trapped, and for some applications translated in space and/or rotated (by modest beam displacements).

Optical trapping does not affect imaging quality as it operates with an independent laser wavelength to that used for light sheet fluorescence microscopy. In addition, there is no media interface to degrade the image quality.

The counter propagating beams may be formed using light from a single source. For example, the counter propagating beams may be formed using light from a single source that is reflected from a mirror.

The counter propagating beams may be provided by two different sources.

The counter propagating beams may be such as to allow movement, for example rotational movement, of a particle within the trap.

The counter propagating beams may be of different intensities thereby to cause movement, for example rotational movement, of a particle within the trap.

The counter propagating beams may be of different polarizations thereby to cause movement, for example rotational movement, of a particle within the trap.

The counter propagating beams may be offset or misaligned thereby to cause movement, for example rotational movement, of a particle within the trap.

The counter propagating beams may be arranged to form the optical trap in a microfluidic device.

According to another aspect of the invention, there is provided a method for imaging a sample comprising trapping a sample in a counter propagating beam optical trap; and using light sheet imaging optics for light sheet imaging the sample, for example a cell, positioned in the optical trap. Preferably, the optical trap is able to hold or position the sample, for example a cell, in such a way that the sample is undistorted, i.e. the sample is held within the trap in its natural undistorted state.

Using counter propagating beam traps, sometimes referred to as dual beam optical tweezers, provides contactless and contamination-free handling of micro-organisms, enabling them to be trapped, and for some applications translated in space and/or rotated (by modest beam displacements).

Optical trapping does not affect imaging quality as it operates with an independent laser wavelength to that used for light sheet fluorescence microscopy. In addition, there is no media interface to degrade the image quality.

The counter propagating beams may be formed using light from a single source. For example, the counter propagating beams may be formed using light from a single source that is reflected from a mirror.

The counter propagating beams may be provided by two different sources.

The counter propagating beams may be such as to allow movement, for example rotational movement, of a particle within the trap.

The counter propagating beams may be of different intensities thereby to cause movement, for example rotational movement, of a particle within the trap.

The counter propagating beams may be of different polarizations thereby to cause movement, for example rotational movement, of a particle within the trap.

The counter propagating beams may be offset or misaligned thereby to cause movement, for example rotational movement, of a particle within the trap.

The counter propagating beams may be arranged to form the optical trap in a microfluidic device.

BRIEF DESCRIPTION OF THE DRAWINGS

Various aspects of the invention will be described with reference to the drawings, of which:

FIG. 4(a) shows a bright field image of an optically trapped S. lamarcki larva.

DETAILED DESCRIPTION OF THE INVENTION

The present invention uses counter propagating beams of light to form an optical trap and light sheet imaging optics for light sheet imaging a particle in the optical trap. Techniques for forming counter propagating laser beam traps are well known in the art. This type of optical trapping uses two gently focused, counter-propagating laser beams to confine large target objects between the foci of the beams. The optical scattering force along a beam propagation direction can be balanced for confinement in this direction, with the gradient force allowing containment in the other two transverse directions. The two foci can be created with a spatial light modulator or by simply combining two beams with different divergence. The former method benefits from a robust and simple set-up but is limited by the high cost of the spatial light modulator. Two optical fibers, each with numerical apertures as low as 0.1, can be used to provide sufficient forces for trapping. This counter-propagating laser beam configuration can also be achieved by creating two foci along the propagation axis of a single beam and reflecting the beam with a mirror to create a counter-propagating configuration. With this arrangement, microorganisms with sizes ranging from 50 μm to 200 μm have been successfully trapped.

Using optical trapping provides a contactless way to both hold a sample in its native medium or environment and move or rotate it without introducing optical aberration. A further benefit of this is that it requires low power density, thus reducing potential photo-damage.

Figure 1:
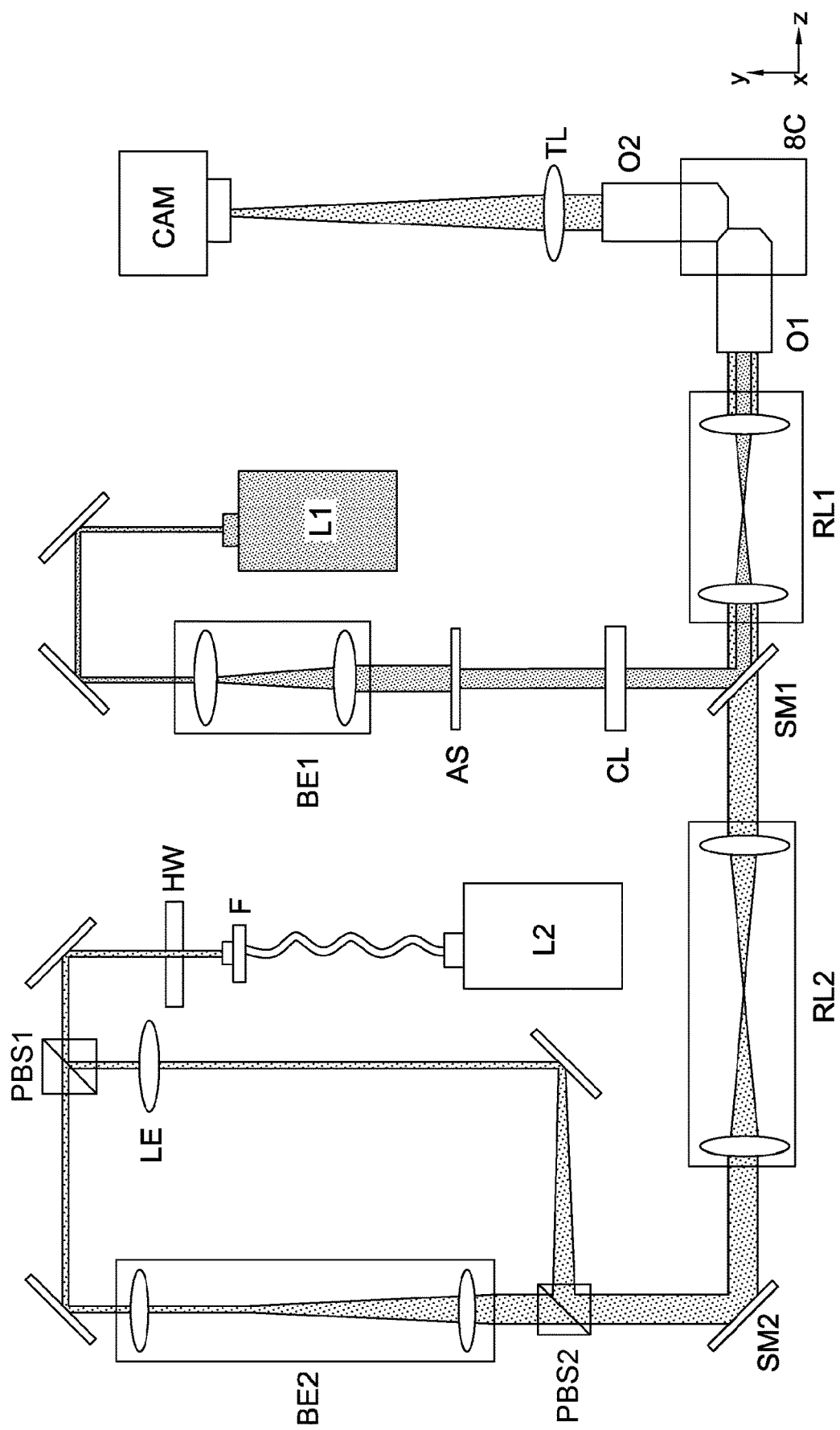
FIG. 1 is a schematic view of a light sheet imaging system with an integrated optical trap system.

FIG. 1 shows a system for optically trapping and light sheet imaging a sample. This has two main sections: an optical arrangement for trapping and holding particles to be imaged, and an optical arrangement for light sheet imaging the particles when in the optical trap. The light sheet imaging optical arrangement is based on the open access project openSPIM. The right side of FIG. 1 shows the imaging section, and the left side shows the optics for delivering a near-infrared trapping laser beam into the sample chamber. The wavelength of the light used for trapping and the wavelength of the light used for imaging have to be selected such that there is no interference between the two. Also, the trap should be such that the sample is not distorted by the optical forces, but instead is held in its natural, undistorted state.

More specifically, the system of FIG. 1 has a laser L1 with, for example, a wavelength of 488 nm, for providing illumination for fluorescent light sheet imaging. The laser beam is collimated and expanded by a 4× beam expander BE1 that has a focal length FL of 25 mm, and 100 mm. An adjustable slit AS varies the width of the beam, which allows the numerical aperture of the illumination to be controlled, and thus the thickness of light sheet. The beam is focused by a cylindrical lens CL onto a steering mirror SM1 and then relayed using relay lens combination RL1 to the back aperture of the illumination objective O1 where the light sheet is formed. Images were taken perpendicular to the illumination plane with an objective O2, a tube lens TL and a camera CAM.

Macro-trapping was achieved by integrating a second optical path into the imaging system through a dichroic mirror SM1. A near-infrared laser L2 with, for example an operating wavelength=1060-1100 nm, is introduced with a fiber F. The polarization state of the beam is controlled by a half-wave plate HW. This enables the laser power distribution between two trapping beams to be controlled. The beam is split into two by a polarizing beam splitter PBS1. The beams are then combined by another polarizing beam splitter PBS2. A relay lens combination RL2 delivers the beam to the dichroic mirror, then to the illumination objective O1.

Figure 2:
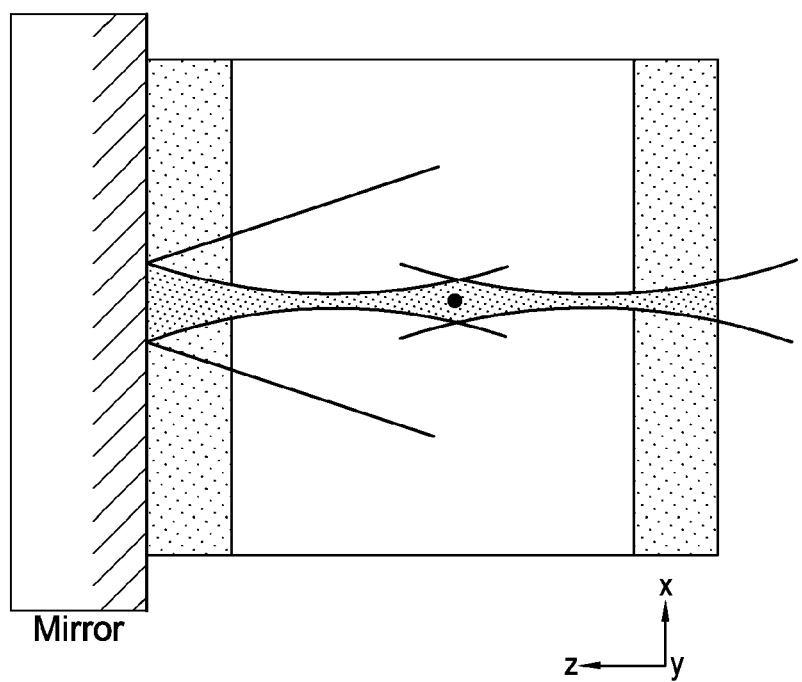
FIG. 2 is a schematic view of a particle in a counter propagating beam optical trap.

In one of the optical paths between the two polarizing beam splitters, the laser beam is expanded BE2 so that it can fill the back aperture of the illumination objective. In the other optical path, the beam divergence is changed by a lens LE, so that the beam is diverging when entering the back aperture of the illumination objective. The two beams go through the same objective O1 and focus at two spots on the same axis at a distance of approximately 0.8 mm apart. A silver mirror is used in the sample chamber to retro-reflect the beam to achieve a counter-propagating trap configuration. This is shown in FIG. 2. The distance between the foci is adjustable by translating the mirror along the illumination axis. In this example, the sample is held in a FEP tube (Ethylene Propylene). This has a similar refractive index to that of water, thus largely avoiding optical aberrations. The tube and the silver mirror were held by a customized holder which is placed upon a manual translation stage M.

The system of FIG. 1 can be used to hold a sample steady/stationary within a trap for imaging. Alternatively characteristics of the beams forming the counter propagating laser beam trap may be varied in order to cause movement of the sample within the trap. This could be small amounts of translational or rotational movement. This movement can be caused by, for example, varying the polarization of the trapping beams. Alternatively or additionally, the alignment of the beams may be varied, for example slightly offset, in order to cause movement within the trap. An advantage of this is, for example, that a sample with the trap could be optically moved, for example rotated, so that multiple light sheet images could be captured at different positions.

Figure 3:
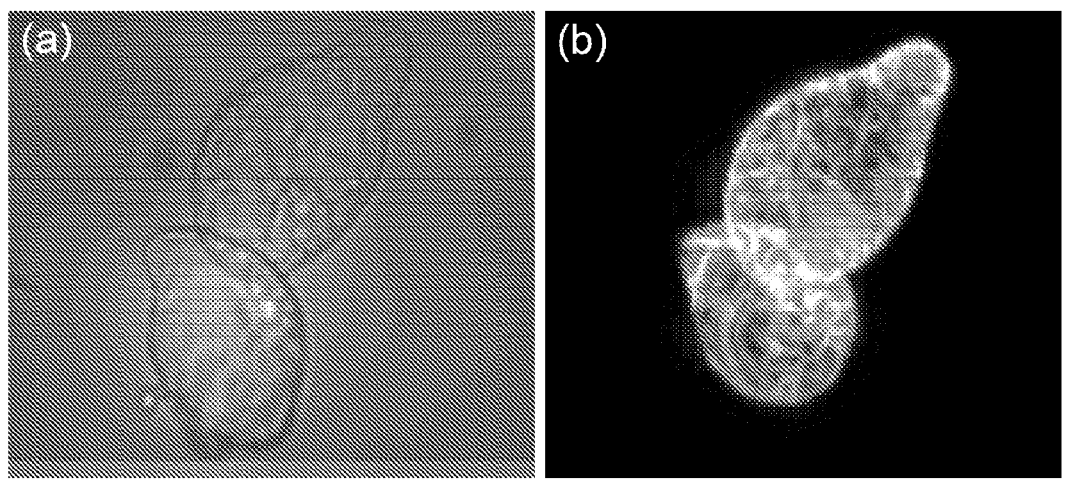
FIG. 3 shows an example of a pair of BY-2 cells trapped and imaged using the system of FIG. 1.

Biological samples such as tobacco Bright Yellow 2 (BY-2) cells and wild type S. lamarcki larvae were trapped and imaged in the system of FIG. 1. The BY-2 cell line was obtained from The James Hutton Institute (JHI), having been genetically modified to stably express GFP (Green Fluorescent Protein). An example of a pair of trapped BY-2 cells is shown in FIG. 3. The trapped tobacco cells were translated along the detection axis to form 3D light sheet fluorescence microscopy images. Translation of the cells was performed by automatically scanning the steering mirror with an actuator (CMA-12CCCL, Newport). Four hundred frames with increment of 0.5 µm at the speed of 8 fps were taken for a complete 3D stack.

S. lamarcki adults were collected from East Sands rocks, St Andrews, and maintained in the circulating seawater aquarium system at the Scottish Oceans Institute, Gatty Marine Laboratory, at ambient seawater temperature. Larvae were obtained by removing adults from their calcareous habitation tubes by breaking away the posterior of the tube with strong forceps and then pushing the adult worm out of the posterior end of the remaining tube with a blunt probe applied to the anterior end. Individual worms were placed into small volumes (500 µL to 750 µL) of 0.1 µm-filtered seawater in multi-well dishes and allowed to spawn their gametes. Eggs from multiple females were harvested into a Petri dish of filtered seawater and sperm collected separately, with sperm from at least two males being mixed and checked for motility under a microscope. One or two drops of sperm were added to the Petri dish of eggs and fertilization allowed to proceed for 15 minutes at room temperature (less than 22 C). The eggs were then poured into a 40 µm cell strainer and passed through several changes of fresh filtered seawater to remove excess sperm. Larvae were then left to develop in filtered seawater at approximately 17 C for 18 hours before imaging.

Figure 4:
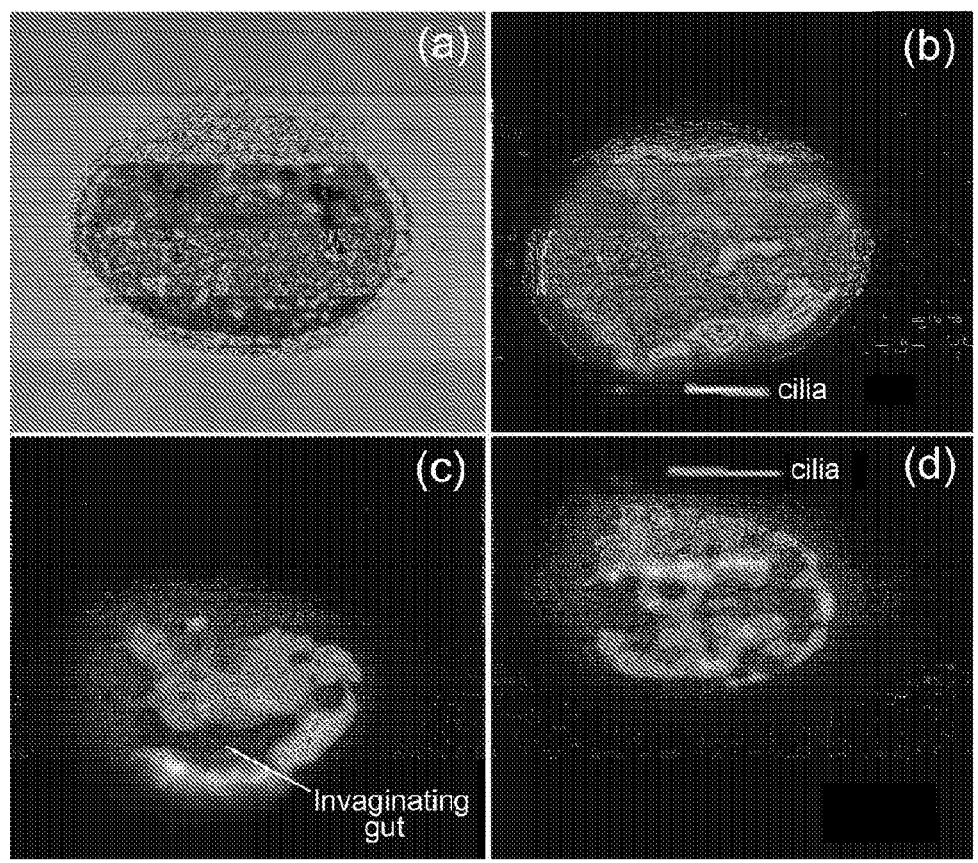
FIGS. 4(b-d) show examples of light sheet images of an optically trapped S. lamarcki larva obtained with autofluorescent signal from the larva.

Live Spirobranchus (formerly Pomatoceros) lamarcki larvae were trapped and sectional auto-fluorescence images taken whilst they were swimming/moving within the trap. S. lamarcki larvae are strong swimmers, moving with a trajectory that normally follows a corkscrew pattern. Typical swimming velocities above 1 mm/s were observed at this early stage of development, which is significantly faster than that of the micro-organisms trapped, which moved at around 100 µm/s to 150 µm/s. Hence, a larva was confined in the trap region, but it maintained its rotational motion whilst trying to break through the confinement of the trap. With the light sheet and detection objective fixed, this rotating movement of the larva enabled section images of it to be recorded, as shown on FIG. 4. In particular, FIG. 4 (a) shows a bright field image and Figures (b-d) show three examples of light sheet images, obtained with auto-fluorescent signal from the larva. As this larva is still at an early stage of development, there is relatively little distinctive morphology to be identified. However, some structures can be recognised, such as the cilia and invaginating gut.

Light sheet microscopy is a powerful approach to construct three-dimensional images of large specimens with minimal photo-damage and photo-bleaching. By integrating a light sheet microscope with an optical trapping system that uses optical forces to trap and hold a sample using a counter propagating laser beam geometry, the present invention offers the potential to significantly expand the range of applications and conditions for light sheet imaging. Applications can include avoidance of agarose so in several instances drugs or other compounds may be added to the sample.

A skilled person will appreciate that variations of the disclosed arrangements are possible without departing from the scope of the invention. For example, the counter propagating laser beam trap can be formed in a microfluidic device. This provides the possibility of high throughput imaging. Individual samples (for example cells) suspended in a flow could be moved into the trapping region, held in the trap and imaged using the light sheet imager. Once the image is obtained, the sample could be released from the trap and fluid flow used to move the sample away from the trapping region, so that another sample/cell can be moved into the trap and imaged. Accordingly the above description of the specific embodiment is made by way of example only and not for the purposes of limitation. It will be clear to the skilled person that minor modifications may be made without significant changes to the operation described.

The invention claimed is:

1. An optical system comprising:
   trapping optics for forming a single beam of light propagating along a propagation axis;
   a mirror located along the propagation axis so as to reflect the single beam of light back along the propagation axis in a counter propagating configuration in which an incident portion of the single beam of light is incident on the mirror and a reflected portion of the single beam of light is reflected from the mirror, the incident and reflected portions of the single beam of light together defining an optical trap;
   light sheet imaging optics for light sheet imaging a particle that is trapped by the optical trap; and
   an illumination objective for illuminating the particle,
   wherein the wavelength of the incident and reflected portions of the single beam of light and the wavelength of the light used for light sheet imaging are non-interfering, and
   wherein the illumination objective is located along the propagation axis between the trapping optics and the mirror so as to focus the single beam of light used to form the optical trap and so as to also focus the light from the light sheet imaging optics for light sheet imaging the particle that is trapped by the optical trap.

2. An optical system as claimed in claim 1 wherein the single beam of light is formed using light from a single source.

3. An optical system as claimed in claim 1 wherein the single beam of light is formed using light from two different sources.

4. An optical system as claimed in claim 1, wherein the incident and reflected portions of the single beam of light are such as to allow movement of a particle within the trap.

5. An optical system as claimed in claim 1, wherein the incident and reflected portions of the single beam of light are of different intensities thereby to cause movement of a particle within the trap.

6. An optical system as claimed in claim 1, wherein the incident and reflected portions of the single beam of light are of different polarizations thereby to cause movement of a particle within the trap.

7. An optical system as claimed in claim 1, wherein the incident and reflected portions of the single beam of light are offset or misaligned thereby to cause movement of a particle within the trap.

8. An optical system as claimed in claim 1, wherein the incident and reflected portions of the single beam of light are arranged to form the optical trap in a microfluidic device.

9. An optical system as claimed in claim 1, wherein the particle is a cell.

10. An optical system as claimed in claim 1, wherein the incident and reflected portions of the single beam of light are such as to allow rotational movement of a particle within the trap.

11. An optical system as claimed in claim 1, wherein the incident and reflected portions of the single beam of light are of different intensities thereby to cause rotational movement of a particle within the trap.

12. An optical system as claimed in claim 1, wherein the incident and reflected portions of the single beam of light are of different polarizations thereby to cause rotational movement of a particle within the trap.

13. An optical system as claimed in claim 1, wherein the incident and reflected portions of the single beam of light are offset or misaligned thereby to cause rotational movement of a particle within the trap.

14. An optical system comprising trapping optics for forming an optical trap using counter propagating beams of light and light sheet imaging optics for light sheet imaging a particle that is trapped by the optical trap, wherein the wavelength of the counter propagating beams of light and the wavelength of the light used for light sheet imaging are non-interfering, wherein the counter propagating beams are formed using light from a single source that is retro-reflected from a mirror, and wherein the optical system further comprises an illumination objective for illuminating the particle and a detection objective for collecting fluorescence emitted by the particle, wherein the illumination objective focuses the light from the single source and the mirror retro-reflects the light from the single source to form the counter propagating beams, and wherein the illumination objective also focuses the light used for light sheet imaging.

15. An optical system as claimed in claim 1, wherein the trapping optics are configured to provide the single beam of light with two foci along the propagation axis, and wherein the illumination objective and the mirror are arranged along the propagation axis so that the mirror reflects the single beam of light back along the propagation axis with a first one of the two foci being located along the propagation axis at a position before reflection of the single beam of light from the mirror and a second one of the two foci being located along the propagation axis at a position after reflection of the single beam of light from the mirror and the optical trap being defined between the two foci.

16. An optical system comprising:
   trapping optics for forming a single beam of light propagating along a propagation axis;
   a mirror located along the propagation axis so as to reflect the single beam of light back along the propagation axis in a counter propagating configuration in which an incident portion of the single beam of light is incident on the mirror and a reflected portion of the single beam of light is reflected from the mirror, the incident portion of the single beam of light defining a first focus and the reflected portion of the single beam of light defining a second focus, and the first and second foci defining an optical trap therebetween; and
   light sheet imaging optics for light sheet imaging a particle that is trapped by the optical trap,
   wherein the wavelength of the incident and reflected portions of the single beam of light and the wavelength of the light used for light sheet imaging are non-interfering.

* * * * *